(12) United States Patent
Chen et al.

(10) Patent No.: US 7,571,884 B2
(45) Date of Patent: Aug. 11, 2009

(54) MOUNTING APPARATUS FOR DATA STORAGE DEVICE

(75) Inventors: Yun-Lung Chen, Taipei Hsien (TW); Qing-Hao Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taiepi Hsien (TW)

( * ) Notice: Subject to any disclaimer, the term of this patent is extended or adjusted under 35 U.S.C. 154(b) by 245 days.

(21) Appl. No.: 11/733,774

(22) Filed: Apr. 11, 2007

(65) Prior Publication Data

US 2008/0151523 A1 Jun. 26, 2008

(30) Foreign Application Priority Data

Dec. 22, 2006 (CN) .................. 2006 2 0016697

(51) Int. Cl.
*E04G 3/00* (2006.01)
(52) U.S. Cl. .................. 248/291.1; 361/679.31; 361/679.33
(58) Field of Classification Search .......... 248/291.1, 248/539; 361/679.31, 679.33, 679.37, 679.38, 361/679.39, 679.4; 312/223.2
See application file for complete search history.

(56) References Cited

U.S. PATENT DOCUMENTS

| 6,556,434 | B1 | 4/2003 | Chan et al. |
| 6,885,551 | B2 * | 4/2005 | Chen .................... 361/679.33 |
| 6,927,973 | B2 * | 8/2005 | Song et al. ............ 361/679.33 |
| 7,016,190 | B1 * | 3/2006 | Chang ................... 361/679.33 |
| 7,036,783 | B2 * | 5/2006 | Chen et al. .............. 248/298.1 |
| 7,379,294 | B2 * | 5/2008 | Chen .................... 361/679.33 |
| 7,382,610 | B2 * | 6/2008 | Lin et al. ............... 361/679.33 |
| 7,443,667 | B2 * | 10/2008 | Guo et al. .............. 361/679.33 |
| 2007/0279860 | A1 * | 12/2007 | Zheng et al. ................ 361/685 |

* cited by examiner

*Primary Examiner*—Amy J Sterling
(74) *Attorney, Agent, or Firm*—Frank R. Niranjan

(57) ABSTRACT

A mounting assembly includes a base (20), a pivot member (30), and a data storage device (50). The base includes a bottom panel (22) with a hook (2231) formed on a resilient cantilever (223) thereof, a first side panel (24) extending from one side of the bottom panel, and a pair of standing pieces (26) extending from two corners of another side of the bottom panel respectively; the pivot member includes a second side panel (34) and a flange panel (32) extending from the second side panel, an opening (321) corresponding to the hook of the base is defined in the flange panel; the data storage device is mounted between the first side panel of the base and the second side panel of the pivot member after the pivot member rotates to a locked position where the hook of the resilient cantilever engages in the opening of the pivot member.

12 Claims, 3 Drawing Sheets

MOUNTING APPARATUS FOR DATA STORAGE DEVICE

This application is related to co-pending U.S. patent application Ser. No. 11/672,963, filed on Feb. 9, 2007, entitled "MOUNTING DEVICE FOR DISK DRIVE"; and co-pending U.S. patent application Ser. No. 11/672,964, entitled "MOUNTING APPARATUS FOR DATA STORAGE DEVICE", filed on Feb. 9, 2007; and co-pending U.S. patent application Ser. No. 11/686,963, entitled "MOUNTING DEVICE FOR DATA STORAGE DEVICE", filed on Mar. 16, 2007. The present application and the co-pending applications are assigned to the same assignee. The disclosures of the above-identified applications are incorporated herein by reference.

BACKGROUND OF THE INVENTION

1. Field of the Invention

The present invention relates to mounting apparatuses, and more particularly to a mounting apparatus for a data storage device of a computer system.

2. Description of Related Art

A typical personal computer comprises data storage devices such as a hard disk drive (HDD), a floppy disk drive, and a compact disc read-only memory (CD-ROM) drive. Conventionally, the data storage devices are attached to a chassis of a computer enclosure using screws. A tool such as a screwdriver is required to fasten the screws when installing the data storage devices, and to unfasten the screws when removing the data storage devices. The operations are laborious and time-consuming. Furthermore, even careful operators may cause the tool to slip, or may drop screws. When this happens, other internal components of the computer may be damaged.

Nowadays, to allow convenient installation of a data storage device in a computer system, a pair of rails is typically provided. The rails are assembled to a pair of sidewalls of the data storage device, and then together inserted into a bracket of the computer system, between a pair of side plates of the bracket. However, the rails will increase space between the sidewalls of the data storage device and the side plates of the bracket, thereby reducing EMI-proofing (Electro Magnetic Interference, EMI) capability of the computer system.

What is needed, therefore, is a mounting apparatus with a simple structure for convenient installation and removal of a data storage device of a computer system.

SUMMARY OF THE INVENTION

A mounting assembly includes a base, a pivot member, and a data storage device. The base includes a bottom panel with a hook formed on a resilient cantilever thereof, a first side panel extending from one side of the bottom panel, and a pair of standing pieces extending from two corners of another side of the bottom panel respectively. The pivot member includes a second side panel and a flange panel extending from the second side panel and an opening corresponding to the hook of the base is defined in the flange panel. The data storage device is mounted between the first side panel of the base and the second side panel of the pivot member after the pivot member rotates to a locked position where the hook of the resilient cantilever engages in the opening of the pivot member.

BRIEF DESCRIPTION OF THE DRAWINGS

Other advantages and novel features will be drawn from the following detailed description of preferred embodiments with attached drawings, in which.

DETAILED DESCRIPTION OF THE INVENTION

Figure 1:
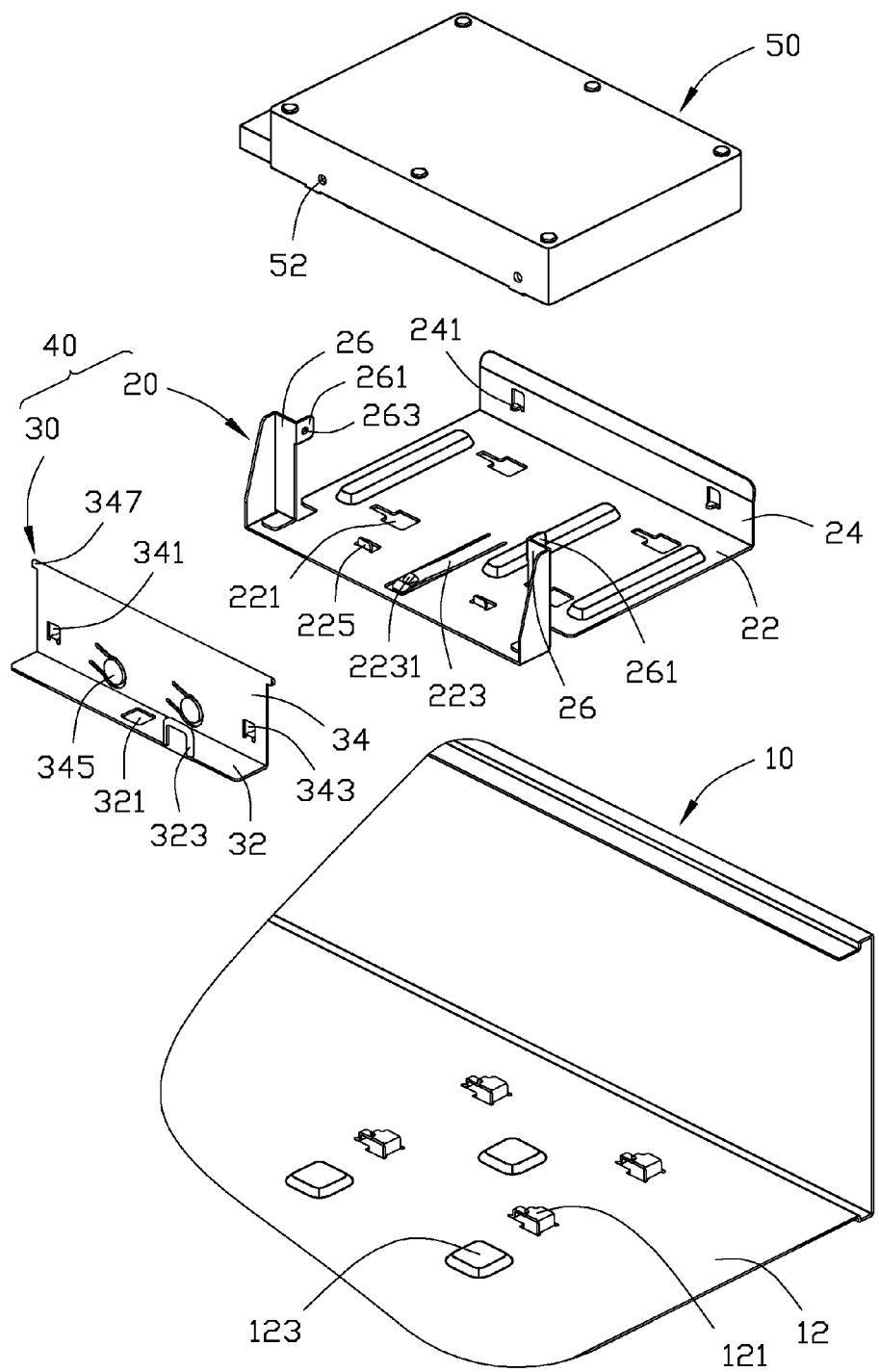
FIG. 1 is an exploded, isometric view of a mounting apparatus for a data storage device according to a preferred embodiment of the present invention, the mounting apparatus including a chassis, and a mounting bracket consisting of a base, and a pivot member.

Referring to FIG. 1, a mounting apparatus of a preferred embodiment of the present invention is configured for securing a data storage device 50. A pair of securing holes 52 is defined in each of two sidewalls of the data storage device 50. In this preferred embodiment, the mounting apparatus includes a mounting bracket 40 for receiving the data storage device 50 therein, and a chassis 10 for accommodating the mounting bracket 40 and the data storage device 50 therein. The mounting bracket 40 includes a base 20 and a pivot member 30 pivotally attached to the base 20.

The chassis 10 includes a bottom panel 12 with a plurality of fixing portions 121 and bulges 123 extending upwardly therefrom.

The base 20 of the mounting bracket 40 includes a bottom panel 22 and a first side panel 24 perpendicularly extending from a side edge of the bottom panel 22. A plurality of T-shaped openings 221 corresponding to the fixing portions 121 are defined in the bottom panel 22 of the base 20, the openings 221 each includes a bigger entrance portion and a smaller securing portion. A resilient cantilever 223 perpendicular to the first side panel 24 extends from a center portion of the bottom panel 22 to another side of the base 20. A hook 2231, such as a barb, is formed on a free end of the cantilever 223. A height of the bulges 123 of the chassis 10 is higher than that of the hook 2231 of the cantilever 223 of the base 20. A pair of standing pieces 26 extends from two opposite corners of said another side of the bottom panel 22 respectively. A supporting piece 261 with a pivot hole 263 defined therein extends from an upper edge of each standing piece 26. A pair of limiting pieces 225 extends upwardly from the bottom panel 22. A distance from the pivot hole 263 to the first side panel 24 is approximately equal to a width of the data storage device 50.

The pivot member 30 of the mounting bracket 40 includes a second side panel 34 and a flange panel 32 extending perpendicularly out from a bottom edge of the second side panel 34. A pair of openings 341, 343 each with a securing piece is defined in the second side panel 34. A pair of resilient anti-EMI plates 345 is formed in the second side panel 34 between the openings 341, 343. A handle 323 extends upwardly from the flange panel 32. A rectangular opening 321 corresponding to the hook 2231 is defined in the flange panel 32. A pair of pivot posts 347 corresponding to the pivot holes 263 of the base 20 extends outwardly from two top ends of the second side panel 34. A distance between the pivot holes 263 is approximately equal to a length of the second side panel 34. A distance from the pivot hole 263 to the bottom panel 22 is equal to a width of the second side panel 34 of the pivot member 30.

Figure 2:
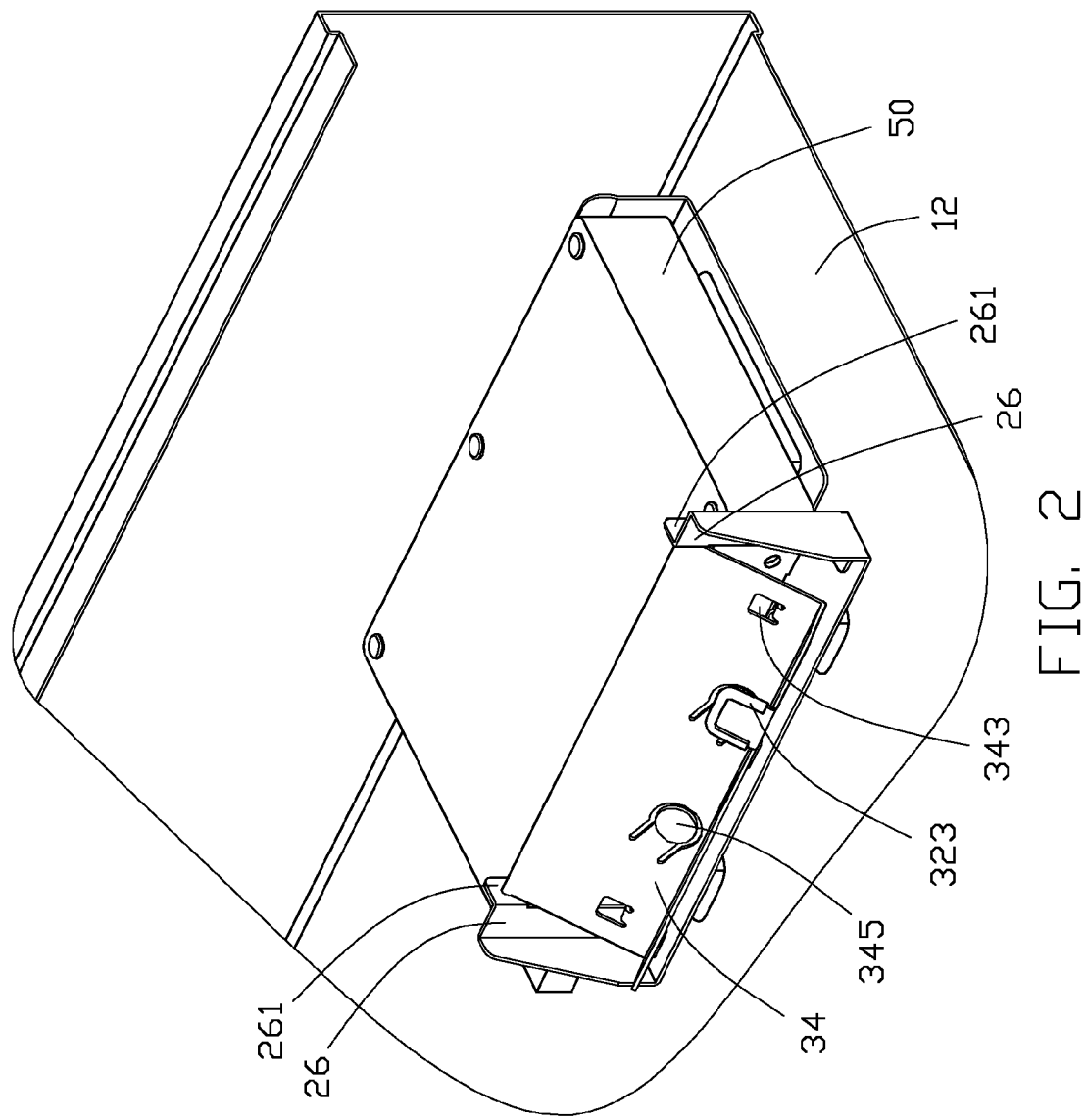
FIG. 2 is a pre-assembled view of FIG. 1.
Figure 3:
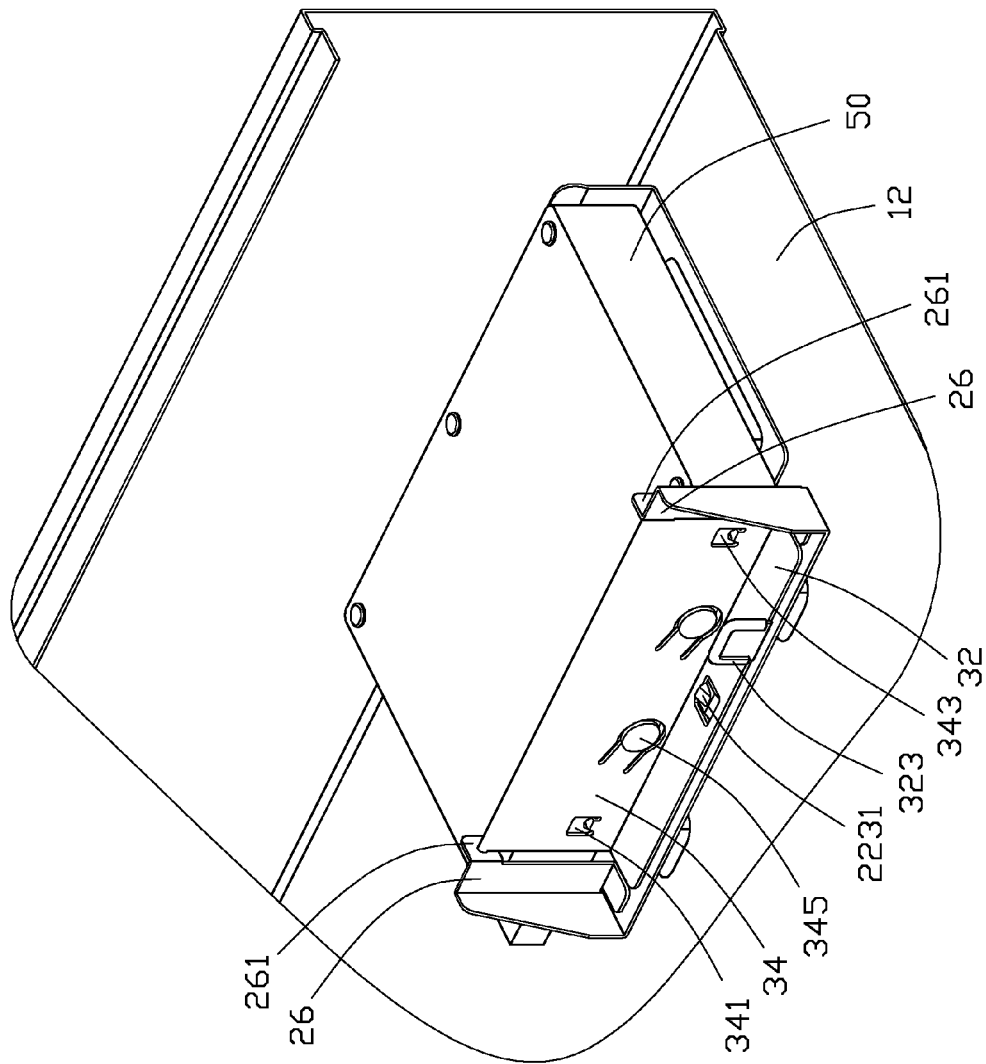
FIG. 3 is an assembled view of FIG. 1.

Referring to FIGS. 2 and 3, in mounting the data storage device 50 to the chassis 10, the base 20 is placed on the bottom panel 12 of the chassis 10 and the fixing portions 121 of the bottom panel 12 are extended through the corresponding entrance portions of the openings 221 of the base 20, then the base 20 is pushed or pulled to slide in a direction parallel to the bottom panel 12 of the chassis 10 until the fixing portions 121 engage with the securing portions of the openings 221. The bulges 123 of the chassis 10 resist against a bottom side of the bottom panel 22 of the base 20. An interspace is configured between the bottom panel 12 of the chassis 10 and the bottom panel 22 of the base 20 for allowing the free end of the cantilever 223 to deform downward. The data storage device 50 is then placed on the bottom panel 22 with the securing pieces 241 of the first side panel 24 inserted into the corresponding securing holes 52 of the data storage device 50. Then two pivot posts 347 of the pivot member 30 are inserted into the corresponding pivot holes 263 respectively. The hook 2231 of the cantilever 223 of the base 20 engages in the rectangular opening 321 of the pivot member 30 after the pivot member 30 rotates to a locked position where the securing pieces of the second side panel 34 insert into the corresponding securing holes 52 of the data storage device 50 and the second side panel 34 is resisted against by the limiting piece 225 of the bottom panel 22 of the base 20. The data storage device 50 is sandwiched between the first and second side panels 24, 34. The anti-EMI plates 345 abut against the corresponding sidewall of the data storage device 50. Thus the data storage device 50 is mounted in the chassis 10 via the mounting bracket 40.

In removing the data storage device 50 from the mounting bracket 40, the hook 2231 of the cantilever 223 is pressed down into the interspace between the base 20 and the chassis 10 to thereby disengage from the opening 321, the pivot member 30 rotates backward to an unlocked position where the securing pieces of the pivot member 30 disengage from the securing holes 52 of the data storage device 50, then the data storage device 50 is moved out from the mounting bracket 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting assembly, comprising:
   a base comprising a bottom panel with a hook formed on a resilient cantilever thereof, a first side panel extending from one side of the bottom panel, and a pair of standing pieces extending from two corners of another side of the bottom panel respectively;
   a pivot member with a top end pivotally attached between the standing pieces of the base, comprising a second side panel and a flange panel extending from the second side panel, an opening corresponding to the hook of the base being defined in the flange panel; and
   a data storage device mounted between the first side panel of the base and the second side panel of the pivot member after the pivot member rotates to a locked position where the hook of the resilient cantilever engages in the opening of the pivot member.

2. The mounting assembly as described in claim 1, wherein a pair of supporting pieces each with a pivot hole defined therein extends from the standing pieces of the base respectively toward the first side panel, a pair of pivot posts each engaging in a corresponding pivot hole extends outward from two top corners of the second side panel of the pivot member.

3. The mounting assembly as described in claim 2, wherein a distance between the pivot hole and the bottom panel is equal to a width of the second side panel of the pivot member between the top end and a bottom end from which the flange panel extends.

4. The mounting assembly as described in claim 1, wherein the resilient cantilever extends from a center portion of the bottom panel toward said another side of the bottom panel of the base, the hook is formed on a free end of the resilient cantilever.

5. The mounting assembly as described in claim 1, wherein the second side panel is upright to the bottom panel, and the flange panel abuts on the bottom panel after the pivot member rotates to the locked position.

6. The mounting assembly as described in claim 1, wherein at least a limiting piece extends from the bottom panel of the base configured for resisting against the second side panel when the pivot member rotates to the locked position.

7. A mounting assembly comprising:
   a base comprising a bottom panel, a first side panel extending from one side of the bottom panel, and a pair of standing members extending from an opposite side of the bottom panel, the first side panel forming at least one securing piece;
   a pivot member attached between the standing members and being pivotable about an axis parallel to the bottom panel, the pivot member comprising a second side panel and a flange panel, the second side panel forming at least one securing piece;
   a data storage device mounted on the bottom panel and sandwiched between the first and second side panels when the pivot member is rotated to a locked position where the securing pieces of the base and the pivot member engage in securing holes of the data storage device respectively; and
   a locking mechanism being formed between the base and the pivot member configured for retaining the pivot member to the locked position.

8. The mounting assembly as claimed in claim 7, wherein each of the standing members comprises a tab extending therefrom toward and being perpendicular to the first side panel, each of the tabs defines a bole, a pair of posts extends from opposite ends of a top side edge of the second side panel and pivotably inserts into the holes respectively.

9. The mounting assembly as claimed in claim 8, wherein the flange panel extends perpendicularly frown a bottom side edge of the second side panel in a direction away from the first side panel.

10. The mounting assembly as claimed in claim 9, wherein the locking mechanism comprises an opening defined in the flange panel, and a resilient cantilever having a hook protruding upward from a distal end thereof, the hook engaging in the opening when the pivot member is in the locked position, the resilient cantilever capable of being deformed downward to cause the hook disengaging from the opening.

11. The mounting assembly as claimed in claim 7, wherein the second side panel forms at least one resilient anti-EMI plate abutting against the data storage device when the pivot member is in the lacked position.

12. The mounting assembly as claimed in claim 7, wherein at least one limiting piece extends upward from the bottom panel of the base and abuts against an inner surface of the second side panel facing the data storage device when the pivot member is in the locked position.

* * * * *